Nov. 27, 1951 — J. JANSOONE — 2,576,510
SIDE LIGHT FOR MOTOR VEHICLES
Filed June 7, 1948

John Jansoone
INVENTOR.

Patented Nov. 27, 1951

2,576,510

UNITED STATES PATENT OFFICE 2,576,510

SIDE LIGHT FOR MOTOR VEHICLES

John Jansoone, Richmond, Calif., assignor of one-half to George Lee, Richmond, Calif.

Application June 7, 1948, Serial No. 31,562

1 Claim. (Cl. 240—8.2)

The present invention relates to new and useful improvement in illuminating means for motor vehicles and more particularly to the provision of a side light for illuminating the area of a highway at one or both sides of the vehicle whereby to increase the safety of night driving.

An important object of this invention is to provide a side light for automobiles or other motor vehicles wherein a lamp housing is recessed in one of the fenders, mud guards, or other side structures of the vehicle to illuminate the side thereof and further to provide a guard to protect the lamp from damage.

A still further object of this invention is to provide a mounting and guard for a lamp housing carried at the side of an automobile fender or mud guard and which may be installed in position thereon in a simple and practical manner and which at the same time is neat and attractive in appearance and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
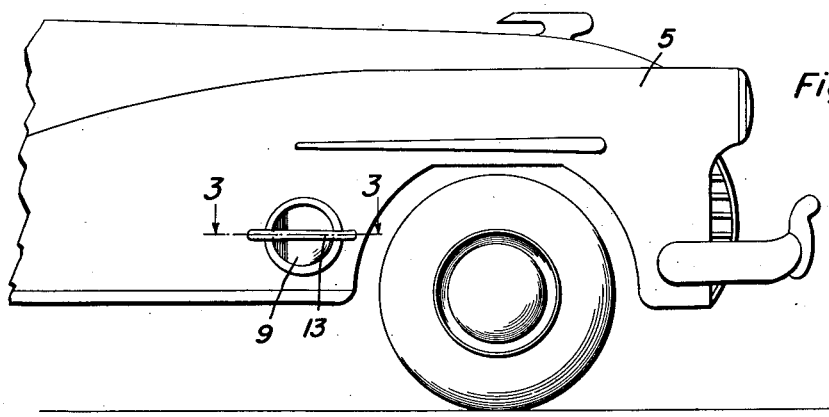
Figure 1 is a side elevational view showing the side lamp mounted in position at the side of a front automobile fender.
Figure 2:
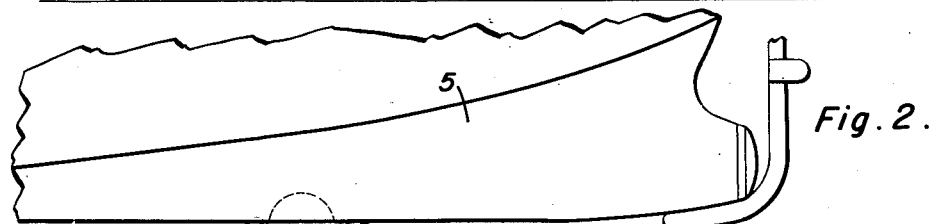
Figure 2 is a top plan view.

Referring now to the drawings in detail wherein for the purpose of illustration I have disclosed a preferred embodiment of the invention the numeral 5 indicates an automobile fender or mud guard the lower side portion of which is formed with an opening 6 having a resilient gasket or sealing ring 7 and suitably secured in the opening.

Figure 3:
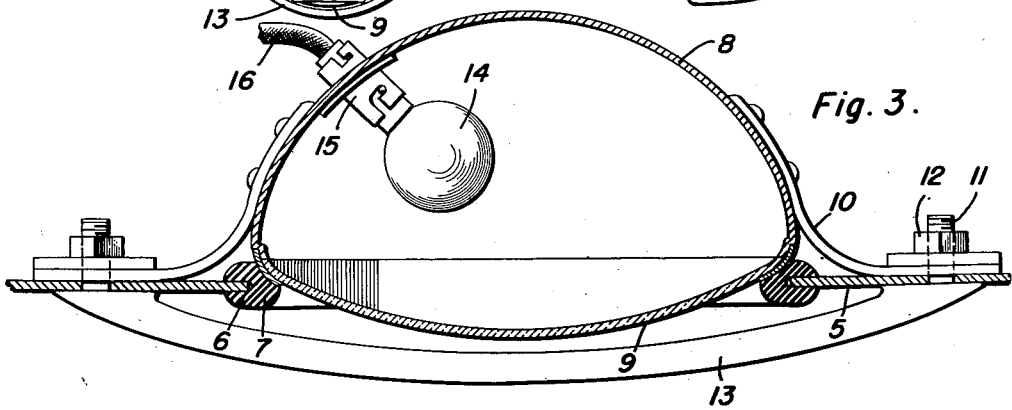
Figure 3 is an enlarged longitudinal sectional view taken substantially on the line 3—3 of Figure 1.

A lamp housing 8 of suitable design or shape is provided with a lens 9 at its front surface and is secured at the inner side of the fender 5 against the gasket 7 by means of a pair of curved brackets 10 secured at one end to the lamp housing and secured at their other ends to the inner surface of the fender 5 by threaded studs 11 and nuts 12 at the ends of an arcuate guard 13 which is positioned against the outer surface of the fender in a horizontal position in front of the lens 9 and with the studs 11 inserted through the fender to a position behind the same as shown more clearly in Figure 3 of the drawings.

The lamp housing 8 is provided with a lamp 14 mounted in a socket 15 at the rear of the housing to which circuit wires 16 are attached leading to a suitable control (not shown) which is located in a position convenient to the driver of the vehicle.

Figure 4:
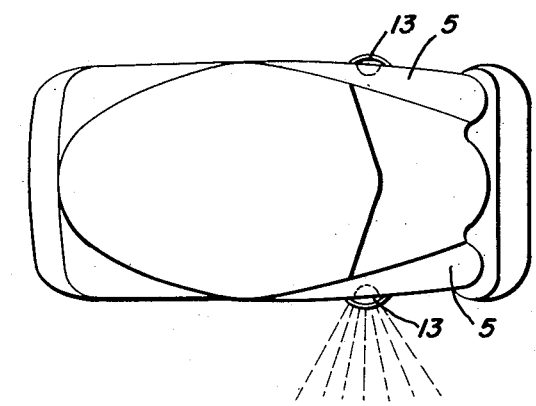
Figure 4 is a top plan view illustrating a motor vehicle with one of the side lights mounted at each side thereof.

As indicated in Figure 4 of the drawings one of the lamp housings 8 may be mounted in the side of each of the front fenders of the vehicle and in a manner whereby rays of light from the lamp will be projected laterally at either or both sides of the vehicle to illuminate the highway at the sides of the car for various purposes incident to night driving.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is understood, however, that even though there is herein shown and described a preferred embodiment of the invention the same is susceptible to certain changes fully comprehended by the spirit of the invention as herein described and the scope of the appended claim.

Having described the invention, what is claimed as new is:

A side light for motor vehicles comprising a lamp housing adapted to be positioned in an opening in the side structure of a vehicle, attaching brackets on the housing, and means for removably securing the brackets to the rear of a vehicle side structure comprising a bar positioned in front of the housing and means at the ends of the bar adapted to extend through a vehicle side structure and the brackets for detachably securing the brackets behind a vehicle side structure and the bar in front of a vehicle side structure.

JOHN JANSOONE.

REFERENCES CITED

The following references are of record in the file of this patent:

UNITED STATES PATENTS

| Number | Name | Date |
|---|---|---|
| 1,473,375 | Kyle | Nov. 6, 1923 |
| 1,752,731 | Caruso | Apr. 1, 1930 |
| 1,846,813 | Pfeiffer | Feb. 23, 1932 |
| 1,887,756 | Gurton et al. | Nov. 15, 1932 |
| 2,131,117 | Phillips | Sept. 27, 1938 |
| 2,184,208 | Brown et al. | Dec. 19, 1939 |
| 2,255,273 | Sauer | Sept. 9, 1941 |
| 2,264,109 | Bridge | Nov. 25, 1941 |
| 2,281,643 | Wahlberg | May 5, 1942 |
| 2,286,448 | Wahlberg | June 16, 1942 |
| 2,301,697 | Harbison | Nov. 10, 1942 |